(12) United States Patent
Imran (10) Patent No.: US 11,262,921 B2
(45) Date of Patent: Mar. 1, 2022

(54) PARTIAL AREA SELF REFRESH MODE

(71) Applicant: QUALCOMM Incorporated, San Diego, CA (US)

(72) Inventor: Mohammad Imran, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 76 days.

(21) Appl. No.: 15/851,504

(22) Filed: Dec. 21, 2017

(65) Prior Publication Data

US 2019/0196730 A1    Jun. 27, 2019

(51) Int. Cl.
*G06F 3/06* (2006.01)
*G06F 1/3287* (2019.01)
*H04W 52/02* (2009.01)
*G06F 1/3234* (2019.01)

(52) U.S. Cl.
CPC .......... *G06F 3/0625* (2013.01); *G06F 1/3275* (2013.01); *G06F 1/3287* (2013.01); *G06F 3/065* (2013.01); *G06F 3/0673* (2013.01); *H04W 52/028* (2013.01)

(58) Field of Classification Search
CPC combination set(s) only.
See application file for complete search history.

(56) References Cited

U.S. PATENT DOCUMENTS

| | | | |
|---|---|---|---|
| 7,581,127 B2 | 8/2009 | Rajan et al. | |
| 8,656,199 B2 | 2/2014 | Cho et al. | |
| 8,988,933 B2 | 3/2015 | Takizawa et al. | |
| 2011/0283071 A1* | 11/2011 | Yokoya | G06F 12/023 711/162 |
| 2011/0296095 A1* | 12/2011 | Su | G06F 12/0292 711/105 |
| 2014/0181558 A1 | 6/2014 | Taha et al. | |
| 2014/0344599 A1* | 11/2014 | Branover | G06F 1/3234 713/323 |
| 2015/0089257 A1* | 3/2015 | Iizuka | G06F 1/3275 713/320 |
| 2015/0277542 A1* | 10/2015 | Chinnakkonda Vidyapoornachary | G06F 1/3275 713/323 |

(Continued)

OTHER PUBLICATIONS

International Search Report and Written Opinion—PCT/US2018/064857—ISA/EPO—dated Feb. 21, 2019.

*Primary Examiner* — Kim Huynh
*Assistant Examiner* — Joshua Neveln
(74) *Attorney, Agent, or Firm* — Qualcomm Incorporated (57) ABSTRACT

A method and an apparatus are provided for powering off a portion of a memory of a mobile system. The apparatus may store data within a memory of the apparatus. The apparatus may copy a first portion of the data stored in a first portion of the memory into a second portion of the memory so that the data is stored in the second portion of the memory. The first and the second portion of the memory may be the same memory type. The disclosure discusses various triggering events that may cause the apparatus to copy the first portion of the data stored in the first portion of the memory into the second portion of the memory. The apparatus may then turn off the first portion of the memory. In this manner, the memory consumes less power when storing the data during a low power mode.

24 Claims, 7 Drawing Sheets

(56) References Cited

U.S. PATENT DOCUMENTS

| | | |
|---|---|---|
| 2016/0034221 A1 | 2/2016 | Zettsu et al. |
| 2017/0153693 A1* | 6/2017 | Duale .................. G06F 1/3212 |

* cited by examiner

PARTIAL AREA SELF REFRESH MODE

BACKGROUND

Technical Field

The present disclosure relates generally to mobile systems, and more particularly, to methods and apparatuses for mobile services with a memory.

Introduction

Mobile systems are widely deployed to provide various telecommunication services such as telephony, video, data, messaging, and broadcasts, position location services from systems such as GPS, data collection and monitoring, telematics, and other types of mobile services. Mobile systems may be deployed in wireless communication devices such as smart phones, integrated into mobile platforms such as automobiles, laptops, sensors, Internet of Things (IoT), etc.

One of the problems with mobile systems is the conservation of battery power. More specifically, even when these types of apparatuses are in a low power mode (e.g., a sleep mode, an idle mode), maintaining critical data in a memory to restore the apparatuses when the apparatus awakens can consume large amounts of power. Thus, techniques for reducing the amount of power needed by the memory to store the data in the low power mode are needed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method and an apparatus are provided for powering off a portion of a memory of a mobile system. The apparatus may store data within a memory of the apparatus. The memory may include a first portion and a second portion of the same memory type. The data may be stored in the apparatus during a normal mode of operation. The apparatus may copy a first portion of the data stored in the first portion of the memory into the second portion of the memory so that the data is stored in the second portion of the memory. The apparatus may then turn off the first portion of the memory. In this manner, the memory consumes less power when storing the data needed to restore the apparatus once the apparatus is awoken.

In an aspect, various triggering events may cause the apparatus to copy the first portion of the data stored in the first portion of the memory into the second portion of the memory. These triggering events may be associated with the apparatus being in non-use for an extended period of time.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of mobile systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media include computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 1:
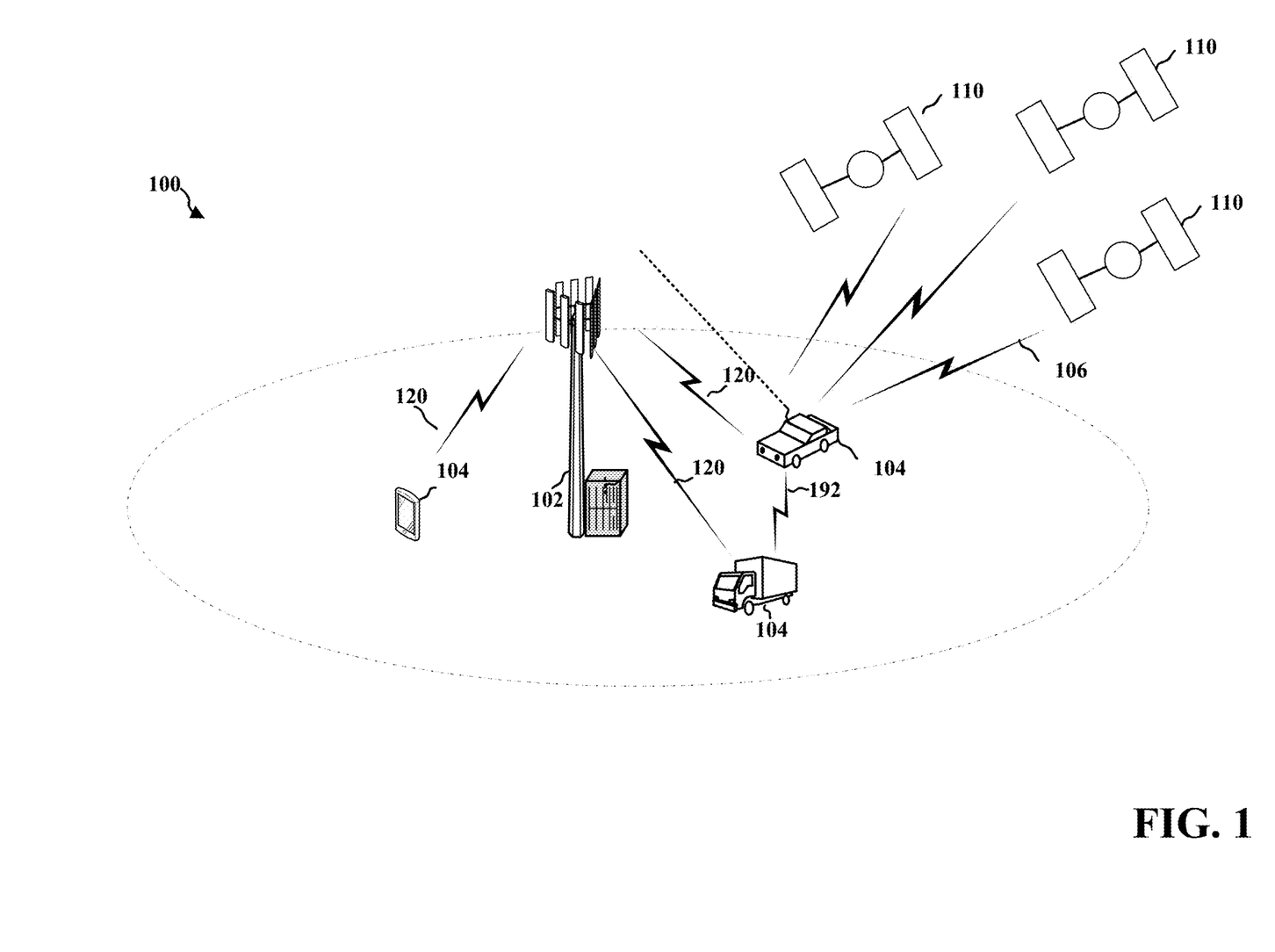
FIG. 1 is a diagram illustrating an example of a mobile system and an access network.

FIG. 1 is a diagram illustrating an example of a mobile system 104 in an access network 100. The mobile system 104 may communicate with the access network 100 such as a wireless communications system (also referred to as a wireless wide area network (WWAN)) that includes a network of base stations 102. The base station 102 may communicate with the mobile system 104 through a communication link 120. The mobile system 104 may receive timing and positioning signals 106 from a constellation of GPS satellites 110 to determine the position of the mobile system 104. The mobile system 104 may communicate with each other using device-to-device (D2D) communication link 192. Examples of mobile systems 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the mobile systems 104 may be integrated into an automobile, a truck, or other types of mobile platforms. Some of the mobile systems 104 may be referred to as IoT devices (e.g., parking meter, gas pump, toaster, vehicles, heart monitor, etc.). The mobile system 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

One of the problems with an apparatus of mobile systems is the conservation of power during a low power mode. For example, critical data may need to be stored in a memory in order to restore the apparatus when the apparatus awakens. Maintaining this critical data stored while consuming less power may thus reduce the amount of power needed by the memory to store the data in the low power mode.

Referring again to FIG. 1, in certain aspects, the mobile system 104 may be configured to store data in the apparatus during a normal mode of operation, copy a first portion of the data stored in a first portion of the memory into a second portion of the memory so that the data is stored in the second portion of the memory, and turn off the first portion of the memory. As explained in further detail below, various triggering events may cause the mobile system 104 to copy the first portion of the data stored in the first portion of the memory into the second portion of the memory so that the data is stored in the second portion of the memory. These triggering events may be associated with the apparatus being in non-use for an extended period of time. The mobile system 104 may then turn off the first portion of the memory. In this manner, the memory consumes less power when storing the data needed to restore the apparatus once the apparatus is awoken.

Figure 2:
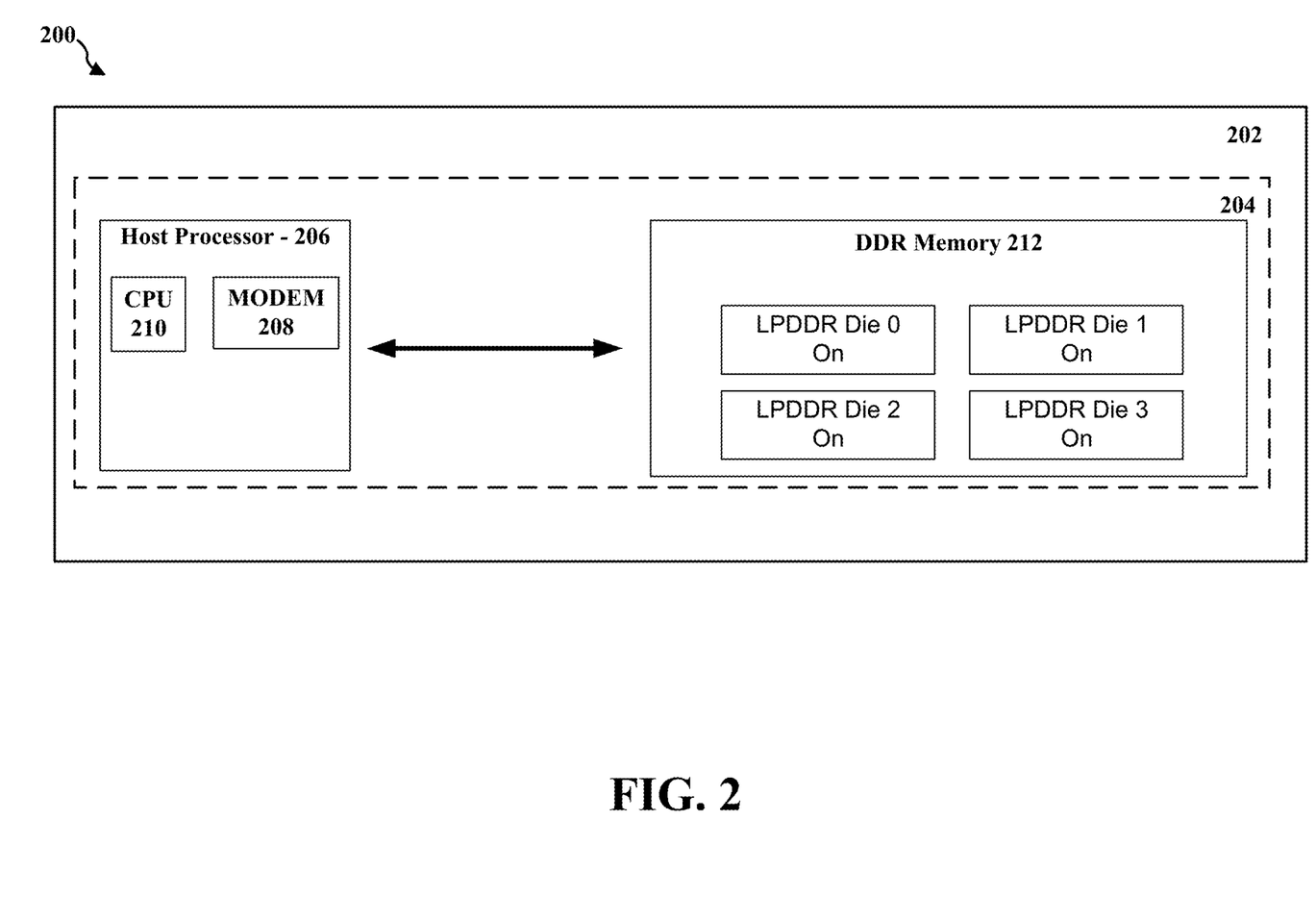
FIG. 2 is a diagram that illustrates one implementation of an apparatus of a mobile system.

FIG. 2 is a diagram 200 illustrating an apparatus 202 for a mobile system, which may be an example of the mobile system 104 described above. The apparatus 202 includes a mobile platform 204, which may be provided as a System on Module (SoM) or a System on Chip (SoC) within the apparatus 202. One example of the mobile platform 204 may be any one of the Snapdragon™ mobile platforms provided by Qualcomm®. Thus, in some aspects, the apparatus 202 may be a smart phone, a tablet, or an IoT device. In another aspect, the apparatus 202 may be integrated into an automobile and may be, for example, a GPS system integrated into the automobile. These types of apparatuses often utilize mobile platforms, such as the mobile platform 204 to provide the apparatus 202 with wireless communication capabilities.

The mobile platform 204 may include a host processor 206. The host processor 206 includes a modem 208 and a central processing unit (CPU) 210. In one aspect, the modem 208 can be a multiband-multimode modem, which can process digital data and communicate with a transceiver such that the digital data is sent and received using the transceiver. In an aspect, the modem 208 may be multiband and be configured to support multiple frequency bands for a specific communications protocol, such as 5G NR. In an aspect, the modem 208 can be multimode and be configured to support multiple operating networks and communications protocols. The modem 208 may control one or more components of the apparatus to enable the transmission and/or reception of signals from the network based on a specified modem configuration. In one implementation, the modem configuration can be based on the mode of the modem and the frequency band in use. In another implementation, the modem configuration can be based on configuration information associated with the apparatus 202, as provided by the network during cell selection and/or cell reselection. In other embodiments, the modem 208 may be a GPS receiver to receive GPS timing and positioning signals from a constellation of GPS satellites such as the GPS satellites 110 of FIG. 1, for determining the position of the mobile platform 204.

The host processor 206 also includes the CPU 210. The CPU 210 may include one or more processors and a read only memory that stores code that may be implemented by the CPU 210 in order for the apparatus to implement IP services, manage Wi-Fi link operations, perform other mobile services, or to provide the procedures described herein. As shown in FIG. 2, the mobile platform 204 include a double data rate memory (DDR memory) 212. In one aspect, the DDR memory 212 may be synchronous dynamic random access memory (SDRAM). The DDR memory 212 is used to store data, such as system configuration and persistent data sets.

The apparatus 202 is shown operating in a low power mode, which is generally entered when the apparatus 202 is not in use by a user. The low power mode may be a sleep mode, an idle mode, or a suspend mode. While in low power mode, the apparatus 202 turns off power to most circuits except a few critical blocks needed to resume operation once the apparatus 202 is awakened. For example, during an idle mode, a display of the apparatus 202 may be turned off and no activity may be provided in the background. With regards to the host processor 206, only a local crystal oscillator may be kept running and the host processor 206 and the DDR memory 212 may be operated at a minimum power level, which may be referred to as a shutdown voltage level, such as Vdd_min. The apparatus 202 may thus operate at a minimum current level, which may be referred to as a rock bottom sleep current (RBSC).

Nevertheless, the DDR memory 212 is configured to store data that is used to restore the operation of the apparatus 202 once the apparatus 202 is awakened. As shown in FIG. 2, the DDR memory 212 includes a plurality of low power DDR (LPDDR) dice. More specifically, the DDR memory 212 includes a LPDDR die 0, a LPDDR die 1, a LPDDR die 2, and a LPDDR die 3. While the disclosure is presented using dies, the disclosure may generally direct to any portions within a memory system. For example, the portions may be pages or any other partition of a memory system.

In this implementation, all of the LPDDR dice in the DDR memory 212 are used to store data while the apparatus 202 is provided in the low power mode. In order to do this, all of the LPDDR dice in the DDR memory 212 remain on while the apparatus 202 is in the sleep mode. Thus, in this implementation, all of the LPDDR dice are provided in self-refresh mode to store restoration data. However, in general, not all of the DDR memory 212 is generally needed to store the restoration data and the DDR memory 212 in full self-refresh mode consumes a significant amount of power, particularly when the data needs to be saved for an extended period of time.

Figure 3:
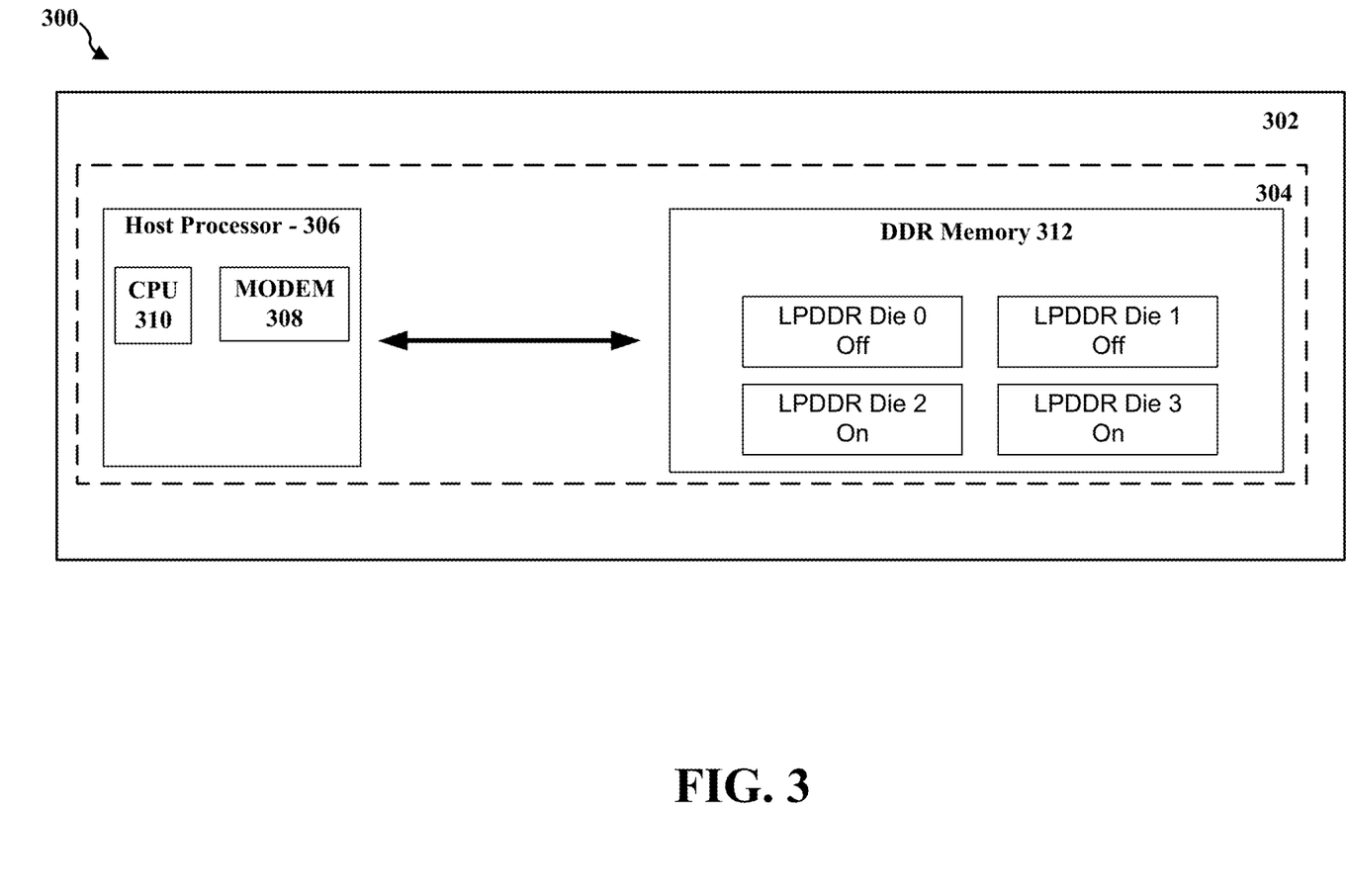
FIG. 3 is a diagram that illustrates another implementation of an apparatus of a mobile system.

FIG. 3 is a diagram 300 illustrating an apparatus 302 for a mobile system, which may be an example of the mobile system 104 described above. The apparatus 302 includes a mobile platform 304, which may be provided as a System on Module (SoM) or a System on Chip (SoC) within the apparatus 302. One example of the mobile platform 304 may be any one of the Snapdragon™ mobile platforms provided by Qualcomm®. Thus, in some aspects, the apparatus 302 may be a smart phone, a tablet, or an IoT device. In another aspect, the apparatus 302 may be integrated into an automobile and may be for example a GPS system integrated into the automobile. These types of apparatuses often utilize mobile platforms, such as the mobile platform 304 to provide the apparatus 302 with wireless communication capabilities.

The mobile platform 304 may include a host processor 306. The host processor 306 includes a modem 308 and a central processing unit (CPU) 310. In one aspect, the modem 308 can be a multiband-multimode modem, which can process digital data and communicate with a transceiver such that the digital data is sent and received using the transceiver. In an aspect, the modem 308 may be multiband and be configured to support multiple frequency bands for a specific communications protocol, such as 5G NR. In an aspect, the modem 308 can be multimode and be configured to support multiple operating networks and communications protocols. The modem 308 may control one or more components of the apparatus to enable the transmission and/or reception of signals from the network based on a specified modem configuration. In one implementation, the modem configuration can be based on the mode of the modem and the frequency band in use. In another implementation, the modem configuration can be based on configuration information associated with the apparatus 302 as provided by the network during cell selection and/or cell reselection. In other embodiments, the modem 308 may be a GPS receiver to receive GPS timing and positioning signals from a constellation of GPS satellites such as the GPS satellites 110 of FIG. 1, for determining the position of the mobile platform 304.

The host processor 306 also includes the CPU 310. The CPU 310 may include one or more processors and a read only memory that stores code that may be implemented by the CPU 310 in order for the apparatus to implement IP services, manage Wi-Fi link operations, perform other mobile services, or to provide the procedures described herein. As shown in FIG. 3, the mobile platform 304 include a DDR memory 312. In one aspect, the DDR memory 312 may be SDRAM. The DDR memory 312 is used to store data, such as system configuration and persistent data sets.

The apparatus 302 is shown operating in a low power mode, which is generally entered when the apparatus 302 is not in use by a user. The low power mode may be a sleep mode, an idle mode, or a suspend mode. While in low power mode, the apparatus 302 turns off power to most circuits except a few critical blocks needed to resume operation once the apparatus 302 is awakened. For example, during an idle mode, a display of the apparatus 302 may be turned off and no activity may be provided in the background. With regards to the host processor 306, only a local crystal oscillator may be kept running and the host processor 306 and the DDR memory 312 may be operated at a minimum power level, which may be referred to as a shutdown voltage level, such as Vdd_min. The apparatus 302 may thus operate at a minimum current level, which may be referred to as a rock bottom sleep current (RBSC).

Nevertheless, the DDR memory 312 is configured to store data that is used to restore the operation of the apparatus 302 once the apparatus 302 is awakened. As shown in FIG. 3, the DDR memory 312 includes a plurality of low power DDR (LPDDR) dice. More specifically, the DDR memory 312 includes a LPDDR die 0, a LPDDR die 1, a LPDDR die 2, and a LPDDR die 3.

In this implementation, the CPU 310 is configured to store data within the DDR memory 312 of the apparatus 302. Thus, during a normal mode of operation, the data may be stored in the LPDDR die 0, the LPDDR die 1, the LPDDR die 2, and the LPDDR die 3. The data may include configuration parameters and persistent data sets that are used during operation of the apparatus 302. The CPU 310 may then be configured to detect a triggering event for a partial area self refresh (PASR) memory mode, as explained in further detail below. As explained in further detail below, the triggering event may be based on a counter that determines that the apparatus 302 has been in a low power mode (e.g., sleep mode) for a predetermined amount of time. In another aspect, the triggering event may be based on the apparatus 302 being in a location that indicates that the apparatus 302 may be in a sleep mode for an extended period of time. Such location may be, for example, a parking garage at an airport. In still another aspect, the triggering event may be a user input where the user indicates that the apparatus 302 should operate in the PASR memory mode.

In one aspect, the CPU 310 is configured to determine whether a portion of the DDR memory 312 has sufficient storage space to store the portion of the data that is stored in another portion of the DDR memory 312. In this implementation, the CPU 310 is configured to determine whether there is sufficient free storage space in the LPDDR die 2 and the LPDDR die 3 to store the portion of the data that is stored in the LPDDR die 0 and the LPDDR die 1. The LPDDR die 0 and the LPDDR die 1 are in an upper rank of the DDR memory 312 and the LPDDR die 2 and the LPDDR die 3 are in a lower rank of the DDR memory 312. The memories or LPDDR dice in a rank may be accessed simultaneously such as by sharing a chip select, while memories or LPDDR dice in different ranks may be accessed independently but not simultaneously.

If there is sufficient free storage space, the CPU 310 is then configured to copy the portion of data stored in the LPDDR die 0 and the LPDDR die 1 of the DDR memory into the LPDDR die 2 and the LPDDR die 3 so that all of the data is stored in the LPDDR die 2 and the LPDDR die 3 of the DDR memory 312. The CPU 310 may do so through read and write instructions that copy the portion of the data stored in the LPDDR die 0 and the LPDDR die 1 into the LPDDR die 2 and the LPDDR die 3. In this manner, all of the data is stored in the LPDDR die 2 and the LPDDR die 3 in response to the triggering event and when the LPDDR die 2 and the LPDDR die 3 of the DDR memory 312 is determined to have sufficient storage space for storing the portion of the data that was stored in the LPDDR die 0 and the LPDDR die 1.

The CPU 310 may then be configured to turn off the LPDDR die 0 and the LPDDR die 1. The LPDDR die 0 and the LPDDR die 1 of the DDR memory 312 may be turned off while the apparatus 302 is in a low power mode (e.g., a sleep mode). The CPU 310 is configured to provide power to the LPDDR die 2 and the LPDDR die 3 while the LPDDR die 0 and the LPDDR die 1 of the DDR memory 312 is turned off. More specifically, in the PASR memory mode, the LPDDR die 0 and the LPDDR die 1 are turned off and the LPDDR die 2 and the LPDDR die 3 are maintained in the self refresh mode. In this manner, the data is all stored in a portion of the DDR memory 312 while the other portion of the DDR memory 312 is turned off during the low power mode. This leads to savings of battery power and thus allows the apparatus 302 to maintain the necessary data needed for the apparatus 302 to recover for longer periods of time.

With regards to the triggering event, the triggering event may be selected to correspond to an event that indicates that the apparatus 302 is not going to be in use for an extended period of time. In some implementations, the copying of the portion of the data from one portion of the DDR memory 312 to the other portion of the DDR memory 312 results in some power loss. Thus, the triggering event should be selected for situations that indicate that the power saving resulting from turning off the LPDDR die 0 and the LPDDR die 1 is greater than the power losses resulting from copying the portion of the data in the LPDDR die 0 and the LPDDR die 1 into the LPDDR die 2 and the LPDDR die 3.

In one aspect, detecting the triggering event may include first the CPU 310 being configured to provide the apparatus 302 in a low power mode (e.g., a sleep mode). However, if the apparatus 302 is to be continually awoken and then placed back into the low power mode, the power saving from the PASR memory mode may not be realized. Accordingly, the CPU 310 may be configured to determine that the apparatus 302 has been in the low power mode for a predetermined time duration before the DDR memory 312 is placed in the PASR memory mode. In one aspect, the predetermined time duration may be 24 hours. The CPU 310 may include a counter that is initiated as a result of the apparatus 302 being placed in the low power mode. Once the counter has counted to the predetermined time duration without the apparatus 302 being awoken, the CPU 310 may carry out the read and write operation to copy the portion of the data stored in the LPDDR die 0 and the LPDDR die 1 into the LPDDR die 2 and the LPDDR die 3 and then turn off the LPDDR die 0 and the LPDDR die 1. More specifically, the CPU 310 may cause power circuitry to cut off power to the LPDDR die 0 and the LPDDR die 1 while maintaining power to the LPDDR die 1 into the LPDDR die 2 while the apparatus 302 is in the low power mode.

In another aspect, detecting the triggering event may include the CPU 310 being configured to obtain location data that identifies a location of the apparatus 302. The CPU 310 may then be configured to determine that the location data indicates that the apparatus 302 is located at a particular type of locale and to trigger the PASR memory mode. For example, if the apparatus 302 is integrated into an automobile, the CPU 310 may determine from the location data that the apparatus 302 is located in a parking garage or in a car rental lot, which indicates that the apparatus 302 is not to be in use for an extended period of time. Accordingly, once the CPU 310 determines that the apparatus 302 is in the parking garage or the car rental lot, the CPU 310 may cause the DDR memory 312 to enter into the PASR memory mode.

In still another aspect, detecting the triggering event may include the CPU 310 being configured to receive a user input that requests that the DDR memory 312 operate in the PASR memory mode. For example, configuration settings may be presented to a user through a display in which the user can select to place the apparatus 302 into a deep sleep mode if the user is not going to use the apparatus 302 for an extended period of time. The user may manipulate the configuration settings to provide a user input that indicates the apparatus 302 is to be placed in a deep sleep mode and thus the DDR memory 312 is to be placed in a PASR mode. Accordingly, once the CPU 310 receives the user input, the CPU 310 may cause the apparatus 302 to enter the deep sleep mode and the CPU 310 then places the DDR memory 312 to enter into the PASR memory mode.

Figure 4:
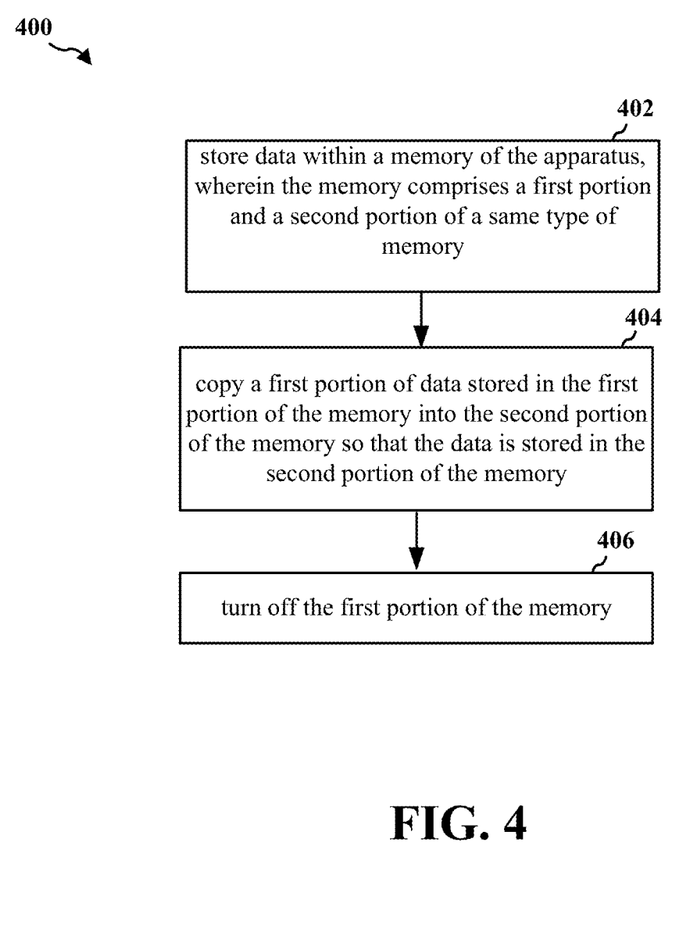
FIG. 4 is a flowchart of a method of operating an apparatus of a mobile system.

FIG. 4 is a flowchart 400 of a method of operating an apparatus of a mobile system. The method may be performed by the mobile system 104, the apparatus 302, the apparatus 602 of FIG. 6, or the apparatus 702 of FIG. 7. At 402, the apparatus may store data within a memory of the apparatus. The memory may include a first portion and a second portion of a same type of memory. For example, the first portion and the second portion of the memory may both be a DDR memory, a DRAM, or other types of volatile memories. At 404, the apparatus may copy a first portion of the data stored in the first portion of the memory into the second portion of the memory so that the first portion of the data is now stored in the second portion of the memory.

In one aspect, the memory may include a plurality of memory dice that store the data. The first portion of the memory comprises a first subset of the memory dice and the second portion of the memory comprises a second subset of the memory dice. In one implementation, the first subset of the memory dice are in a first rank of the memory and the second subset of the memory dice are in a second rank of the memory.

At 406, the apparatus may then turn off the first portion of the memory. The first portion of the memory is turned off while the apparatus is in a low power mode. The apparatus may maintain power to the second portion of the memory while the first portion of the memory is turned off. In this manner, all of the data is stored in the second portion of the memory and the apparatus can save power by not powering the first portion of the memory.

Figure 5:
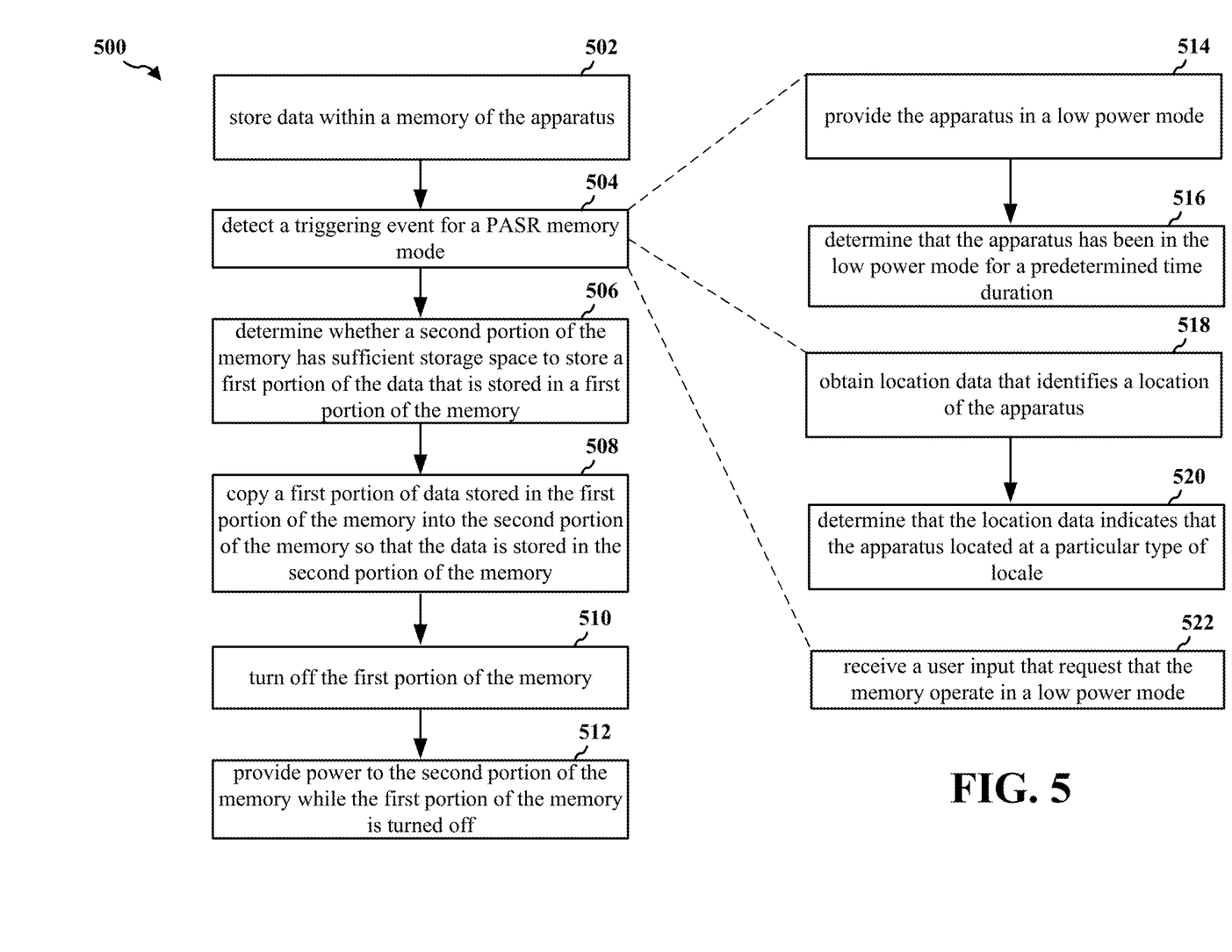
FIG. 5 is a flowchart of another method of operating an apparatus of a mobile system.

FIG. 5 is a flowchart 500 of a method of operating an apparatus of a mobile system. The method may be performed by the mobile system 104, the apparatus 302, the apparatus 602 of FIG. 6, or the apparatus 702 of FIG. 7. At 502, the apparatus may store data within a memory of the apparatus. At 504, the apparatus may detect a triggering event for a PASR memory mode. The apparatus may also then determine whether a second portion of the memory has sufficient storage space to store a first portion of the data that is stored in the first portion of the memory at 506. If there is sufficient storage space, the apparatus may then copy the first portion of the data stored in a first portion of the memory into a second portion of the memory so that the data is stored in the second portion of the memory at 508. The first portion of the data may thus be copied into the second portion of the memory in response to the triggering event and when the second portion of the memory is determined to have sufficient storage space for storing the first portion of the data.

In one aspect, the memory may include a plurality of memory dice that store the data. The first portion of the memory comprises a first subset of the memory dice and the second portion of the memory comprises a second subset of the memory dice. In one implementation, the first subset of the memory dice are in a first rank of the memory and the second subset of the memory dice are in a second rank of the memory.

The apparatus may then turn off the first portion of the memory at 510. The first portion of the memory is turned off while the apparatus is in a low power mode. Furthermore, at 512, the apparatus may provide power to the second portion of the memory while the first portion of the memory is turned off. In this manner, all of the data is stored in the second portion of the memory and the apparatus can save power by not powering the first portion of the memory.

As discussed above, different triggering events may cause the memory to enter the PASR mode. In one aspect, to detect the triggering event at 504, the apparatus may provide the apparatus in a low power mode at 514. The apparatus may then determine that the apparatus has been in the low power mode for a predetermined time duration at 516.

In another aspect, to detect the triggering event at 504, the apparatus may obtain location data that identifies a location of the apparatus at 518. The apparatus may then determine that the location data indicates that the apparatus is located at a particular type of locale at 520.

In still another aspect, to detect the triggering event at 504, the apparatus may receive a user input that requests that the memory operate in the PASR memory mode at 522.

Figure 6:
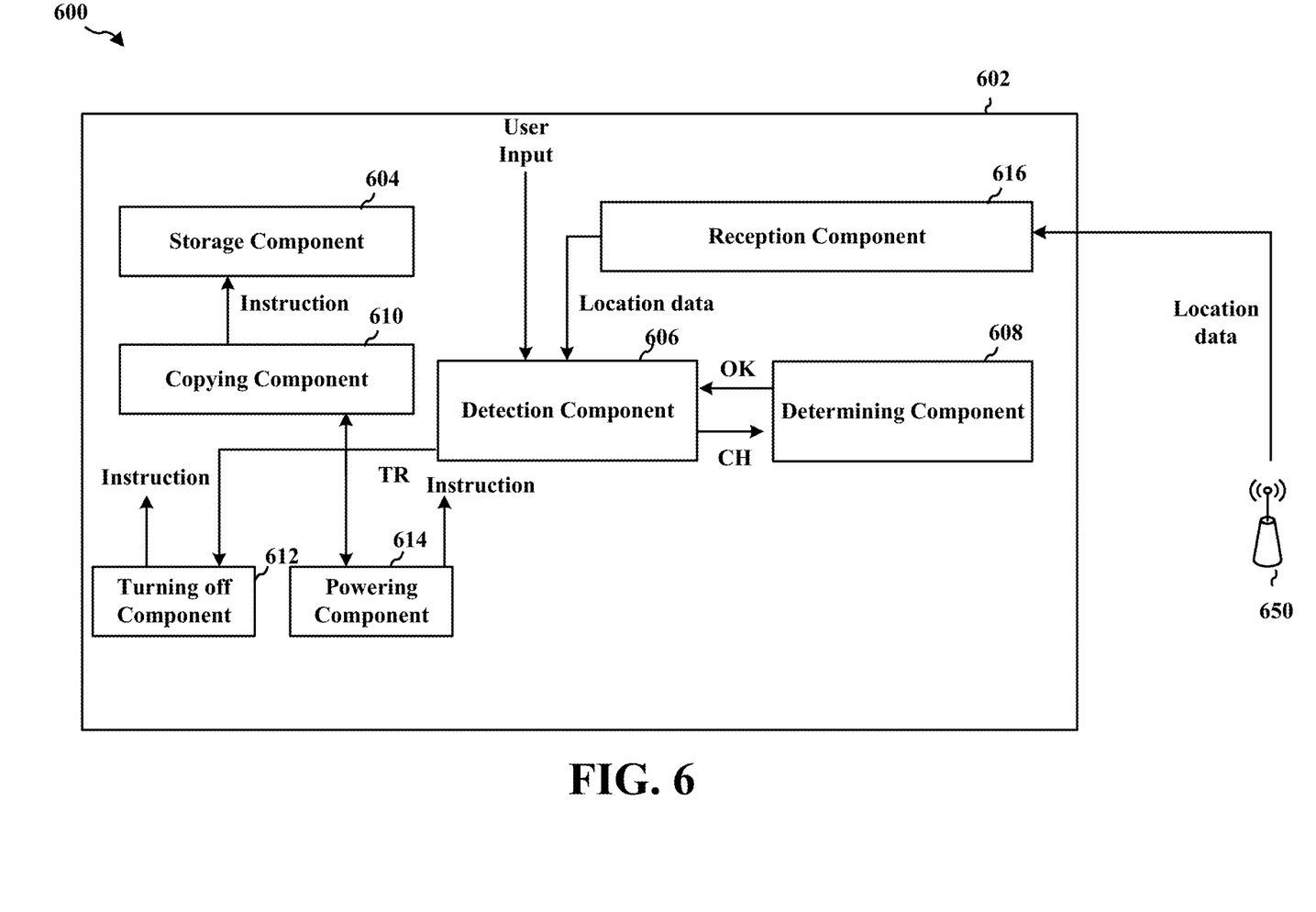
FIG. 6 is a conceptual data flow diagram illustrating the data flow between different components in an exemplary apparatus.

FIG. 6 is a conceptual data flow diagram 600 illustrating the data flow between different components in an exemplary apparatus 602. The apparatus may be the mobile system 104, the apparatus 302, or the apparatus 702 of FIG. 7. The apparatus includes a storage component 604 that stores data within a memory of the apparatus, the memory including a first portion and a second portion, a detection component 606 that detects a triggering event for a PASR memory mode, a determining component 608 that determines whether the second portion of the memory has sufficient storage space to store a first portion of the data that is stored in the first portion of the memory, a copying component 610 that copies the first portion of the data stored in the first portion of the memory into the second portion of the memory so that the data is stored in the second portion of the memory, a turning off component 612 that turns off the first portion of the memory, and a powering component 614 that provides power to the second portion of the memory while the first portion of the memory is turned off.

As shown in FIG. 6, the storage component 604 may store the data within the entire memory during a normal mode of operation (e.g., to instruct the memory of certain operations). The detection component 606 may then detect a triggering event for a PASR mode. In one aspect, the apparatus 602 may be provided in a low power mode. The detection component 606 may have a counter that determine when the apparatus 602 has been in the low power mode for a predetermined amount of time. In another aspect, the detection component 606 obtains location data that identifies a location of the apparatus from a reception component 616. The reception component 616 may be in communication with a base station 650, which determines the location of the apparatus 602 and provides the location data to the reception component 616. In other aspects, the reception component 616 may determine the location of the apparatus 602 from signals received from the base station 650 or signals received from the GPS satellites 110. The detection component 606 may then determine that the location data indicates that the apparatus is located at a particular type of locale. In still another aspect, detection component 606 may receive a user input that requests that the memory operate in the PASR memory mode.

The detection component 606 may then transmit a check memory signal CH to the determining component 608 so that the determining component 608 determines whether the second portion of the memory has sufficient storage space to store the first portion of the data that is stored in the first portion of the memory. If there is sufficient storage space, the determining component 608 transmits an ok signal to the detection component 606. The detection component 606 then transmits a TR signal to the copying component 610, the turning off component 612, and the powering component 614 to trigger the storage component 604 to enter the PASR mode. The copying component 610 then provides instructions that cause the storage component 604 to copy the first portion of the data stored in the first portion of the memory into the second portion of the memory so that the data is stored in the second portion of the memory. Next, the turning off component 612 provides instructions to the storage component 604 that cause the storage component 604 to turn off the first portion of the memory. Finally, the powering component 614 provides instructions to the storage component 604 that cause the storage component 604 to provide or maintain power to the second portion of the memory while the first portion of the memory is turned off.

Figure 7:
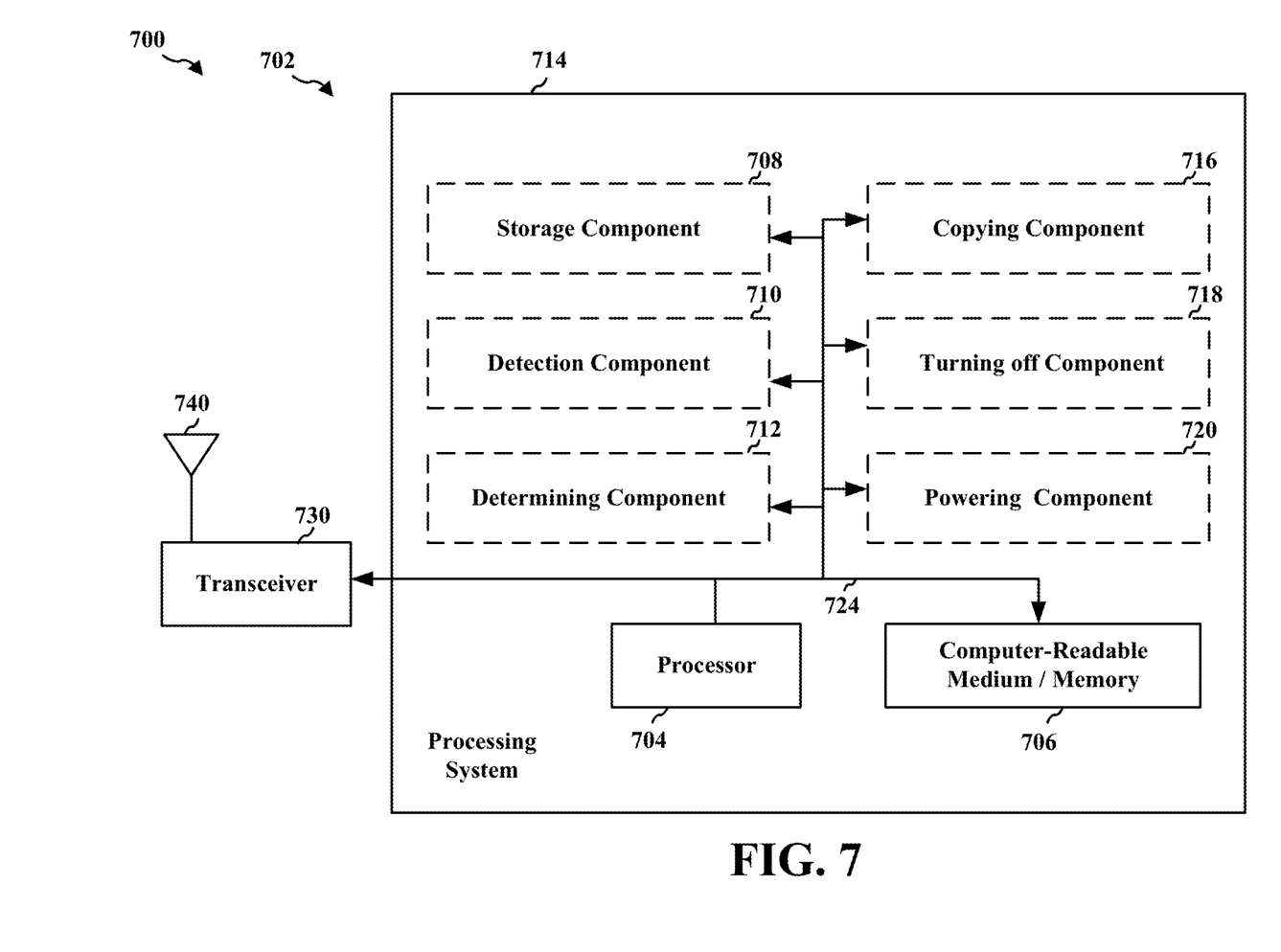
FIG. 7 is a diagram illustrating an example of a hardware implementation for an apparatus employing a processing system.

FIG. 7 is a diagram 700 illustrating an example of a hardware implementation for an apparatus 702 employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 708, 710, 712, 716, 718, 720, and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 730. The transceiver 730 is coupled to one or more antennas 740. The transceiver 730 provides a means for communicating with various other apparatus over a transmission medium. The transceiver 730 receives a signal from the one or more antennas 740, extracts information from the received signal, and provides the extracted information to the processing system 714, such as the reception component 616 of FIG. 6. The processing system 714 includes the processor 704 coupled to the computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing the software. The processing system 714 further includes at least one of the storage component 708, the detection component 710, the determining component 712, the copying component 716, the turning off component 718, and the powering component 720. These components may function as described for the apparatus of FIG. 6. The components may be software components running in the processor 704, resident/stored in the computer readable medium/memory 706, one or more hardware components coupled to the processor 704, or some combination thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the claim language, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating an apparatus, comprising:

storing, within a memory of the apparatus, data that is used to restore operation of the apparatus after the apparatus has been operating in a low power mode with a plurality of circuit blocks of the apparatus including a host processor operating at a reduced power level, wherein the memory comprises a first portion and a second portion of a same type of memory, a first portion of the data is stored on the first portion of the memory, and a second portion of the data is stored on the second portion of the memory;

wherein triggering events for a partial area self refresh (PASR) memory mode are (a) determining that the apparatus has been in the low power mode for a predetermined time duration, (b) determining location data that identifies a location of the apparatus, and (c) receiving an input that requests that the memory operate in a PASR memory mode;

detecting a triggering event of the triggering events for a PASR memory mode, wherein detection of any triggering event causes the memory to enter the PASR memory mode;

in response to detecting the triggering event, copying the first portion of the data stored in the first portion of the memory into the second portion of the memory so that the data that is used to restore operation of the apparatus is stored in the second portion of the memory; and turning off the first portion of the memory while the apparatus is in the low power mode that is entered when the apparatus is not in use by a user, and wherein power saving from turning off the first portion of the memory is greater than power losses resulting from copying the first portion of the data stored in the first portion of the memory into the second portion of the memory.

2. The method of claim 1, wherein the determining that the apparatus has been in the low power mode for a predetermined time duration is based on a counter.

3. The method of claim 1, wherein the determining location data that identifies the location of the apparatus further comprises; obtaining location data that identifies the location of the apparatus and determining that the location data indicates that the apparatus is located at a particular type of locale.

4. The method of claim 1, wherein:

the memory comprises a plurality of memory dice that store the data;

the first portion of the memory comprises a first subset of the memory dice;

the second portion of the memory comprises a second subset of the memory dice.

5. The method of claim 4, wherein the first subset of the memory dice is in a first rank of the memory and the second subset of the memory dice is in a second rank of the memory.

6. The method of claim 1, further comprising determining whether the second portion of the memory has sufficient storage space to store the first portion of the data that is stored in the first portion of the memory, wherein copying the first portion of the data stored in the first portion of the memory into the second portion of the memory occurs when the second portion of the memory is determined to have the sufficient storage space for storing the first portion of the data.

7. The method of claim 1, further comprising providing power to the second portion of the memory while the first portion of the memory is turned off.

8. An apparatus, comprising:
a storage component configured to store, within a memory of the apparatus, data that is used to restore operation after the apparatus has been operating in a low power mode with a plurality of circuit blocks of the apparatus including a host processor operating at a reduced power level, wherein the memory comprises a first portion and a second portion of a same type of memory, a first portion of the data is stored on the first portion of the memory, and a second portion of the data is stored on the second portion of the memory;
wherein triggering events for a partial area self refresh (PASR) memory mode are (a) determining that the apparatus has been in the low power mode for a predetermined time duration, (b) determining location data that identifies a location of the apparatus, and (c) receiving an input that requests that the memory operate in a PASR memory mode;
a detection component configured to detect a triggering event of the triggering events for a (PASR) PASR memory mode;
a copying component configured to, in response to detecting the triggering event, copy the first portion of the data stored in the first portion of the memory into the second portion of the memory so that the data that is used to restore operation of the apparatus is stored in the second portion of the memory; and
a turning off component configured to turn off the first portion of the memory while the apparatus is in the low power mode, that is entered when the apparatus is not in use, and
wherein power saving from turning off the first portion of the memory is greater than power losses resulting from copying the first portion of the data stored in the first portion of the memory into the second portion of the memory.

9. The apparatus of claim 8, wherein the detecting detection component is further configured to provide the apparatus has been in the low power mode for a predetermined time duration is based on a counter.

10. The apparatus of claim 8, wherein the detecting component is further configured to: determine the location of the apparatus; and obtain location data that identifies the location of the apparatus and determine that the location data indicates that the apparatus is located at a particular type of locale.

11. The apparatus of claim 8, wherein:
the memory comprises a plurality of memory dice that store the data;
the first portion of the memory comprises a first subset of the memory dice;
the second portion of the memory comprises a second subset of the memory dice.

12. The apparatus of claim 11, wherein the first subset of the memory dice is in a first rank of the memory and the second subset of the memory dice is in a second rank of the memory.

13. The apparatus of claim 8, further comprising a determining component configured to determine whether the second portion of the memory has sufficient storage space to store the first portion of the data that is stored in the first portion of the memory, wherein the copying component is configured to copy the first portion of the data stored in the first portion of the memory into the second portion of the memory when the second portion of the memory is determined to have the sufficient storage space for storing the first portion of the data.

14. The apparatus of claim 8, further comprising a powering component configured to provide power to the second portion of the memory while the first portion of the memory is turned off.

15. The apparatus of claim 8, further comprising one of a smart phone, an automobile, a laptop, a sensor, or an Internet of Things device incorporating the memory, the storage component, the copying component, and the turning off component.

16. An apparatus, comprising:
a memory; and
at least one processor coupled to the memory and configured to:
store, within the memory, data that is used to restore operation of the apparatus after the apparatus has been operating in a low power mode with a plurality of circuit blocks of the apparatus including the at least one processor operating at a reduced power level, wherein the memory comprises a first portion and a second portion of a same type of memory, a first portion of the data is stored on the first portion of the memory, and a second portion of the data is stored on the second portion of the memory;
wherein triggering events for a partial area self refresh (PASR) memory mode are (a) determining that the apparatus has been in the low power mode for a predetermined time duration, (b) determining location data that identifies a location of the apparatus, and (c) receiving an input that requests that the memory operate in a PASR memory mode;
detect a triggering event of the triggering events for a PASR memory mode, wherein detection of any triggering event causes the memory to enter the PASR memory mode;
copy the first portion of the data stored in the first portion of the memory into the second portion of the memory so that the data that is used to restore operation of the apparatus is stored in the second portion of the memory; and
wherein the at least one processor is configured to detect the triggering event by being configured to determine that the apparatus has been in the low power mode for a predetermined time duration using a counter, and wherein power saving from turning off the first portion of the memory is greater than power losses resulting from copying the first portion of the data stored in the first portion of the memory into the second portion of the memory.

17. The apparatus of claim 16, wherein the at least one processor is configured to determine that the apparatus has been in the low power mode for a predetermined time duration based on a counter.

18. The apparatus of claim 16, wherein the at least one processor is configured to determine location data that identifies the location of the apparatus indicates that the apparatus is located at a particular type of locale.

19. The apparatus of claim 16, wherein:
the memory comprises a plurality of memory dice that store the data;
the first portion of the memory comprises a first subset of the memory dice;
the second portion of the memory comprises a second subset of the memory dice.

20. The apparatus of claim 19, wherein the first subset of the memory dice is in a first rank of the memory and the second subset of the memory dice is in a second rank of the memory.

21. The apparatus of claim 16, wherein the at least one processor is further configured to determine whether the second portion of the memory has sufficient storage space to store the first portion of the data that is stored in the first portion of the memory, wherein the at least one processor is configured to copy the first portion of the data stored in the first portion of the memory into the second portion of the memory when the second portion of the memory is determined to have the sufficient storage space for storing the first portion of the data.

22. The apparatus of claim 16, wherein the at least one processor is further configured to provide power to the second portion of the memory while the first portion of the memory is turned off.

23. The apparatus of claim 16, further comprising one of a smart phone, an automobile, a laptop, a sensor, or an Internet of Things device incorporating the memory and the at least one processor.

24. A method of operating an apparatus, comprising:
storing, within a memory of the apparatus, data that is used to restore operation of the apparatus after the apparatus has been operating in a low power mode with a plurality of circuit blocks of the apparatus including a host processor operating at a reduced power level, wherein the memory comprises a first portion and a second portion of a same type of memory, a first portion of the data is stored on the first portion of the memory, and a second portion of the data is stored on the second portion of the memory;

wherein triggering events for a partial area self refresh (PASR) memory mode are (a) determining that the apparatus has been in the low power mode for a predetermined time duration, (b) determining location data that identifies a location of the apparatus, and (c) receiving an input that requests that the memory operate in a PASR memory mode, wherein detecting a triggering event of the triggering events comprises a request that the memory operate in the PASR memory mode;

in response to detecting the triggering event, copying the first portion of the data stored in the first portion of the memory into the second portion of the memory so that the data that is used to restore operation of the apparatus is stored in the second portion of the memory; and turning off the first portion of the memory while the apparatus is in the low power mode that is entered when the apparatus is not in use by a user, wherein power saving from turning off the first portion of the memory is greater than power losses resulting from copying the first portion of the data stored in the first portion of the memory into the second portion of the memory.

* * * * *